United States Patent Office 2,953,936
Patented Sept. 27, 1960

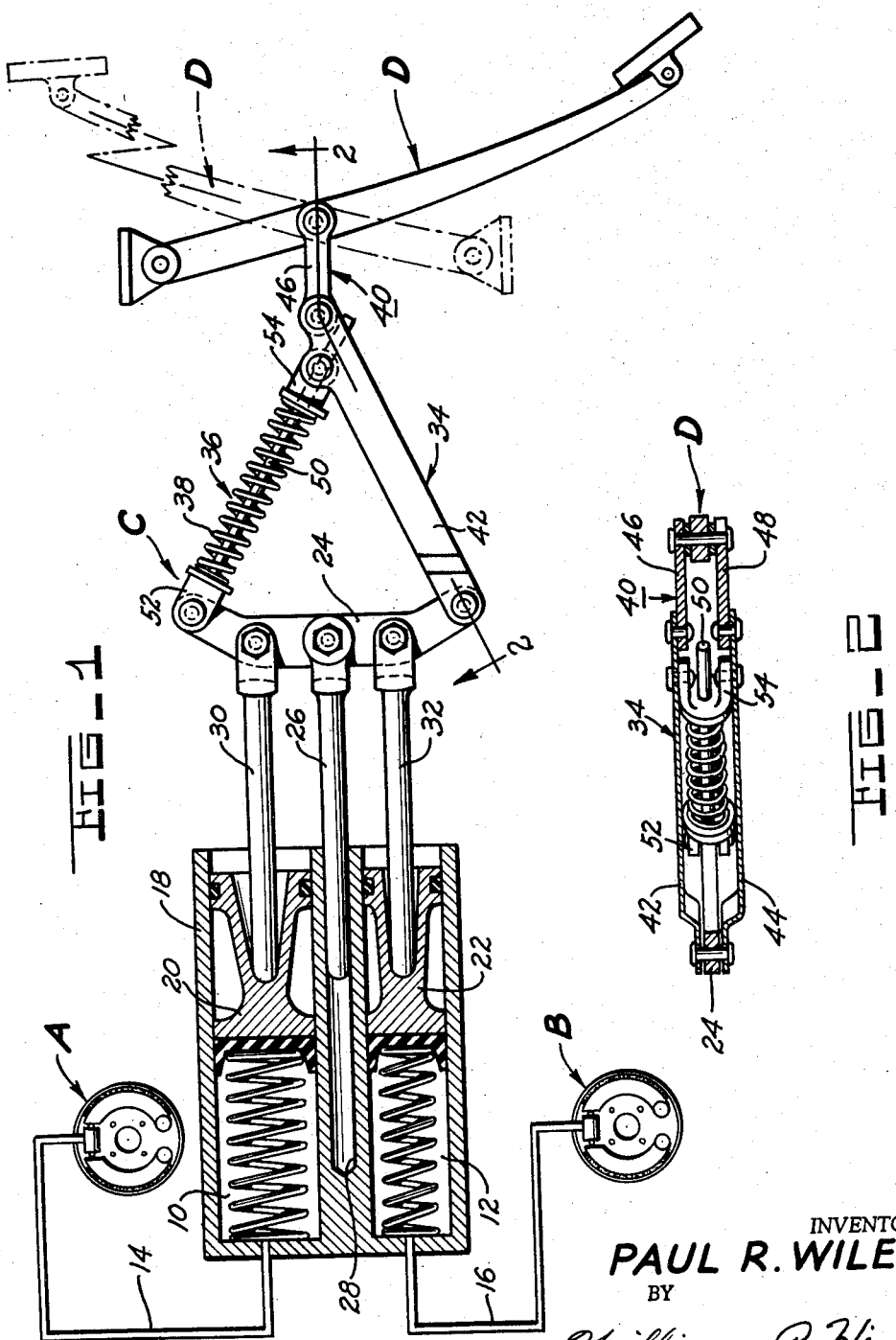

2,953,936

AUTOMOTIVE BRAKE ACTUATING SYSTEM AND THE LIKE

Paul R. Wiley, Florissant, Mo., assignor to The Bendix Corporation, a corporation of Delaware Filed June 20, 1958, Ser. No. 743,426

4 Claims. (Cl. 74—478)

The present invention relates as indicated to an improved automotive brake actuating system and the like: and more particularly to a force transmitting mechanism for distributing an actuating force between two driven systems and which will automatically change the ratio of the delivered force to each system as the actuating force varies in intensity.

An object of the present invention is the provision of a new and improved force transmitting mechanism for distributing an actuating force to two driven devices in a manner automatically changing the percentage of actuating force that is applied to each of the driven devices as the amount of actuating force increases.

Another object of the present invention is the provision of a new and improved mechanism of the above described type wherein a force distributing member is pivotally connected to each of the driven devices at spaced points, a pair of force transmitting links each of which has an end pivotally connected to the force distributing member at spaced points and are pivotally connected to each other in a manner forming a triangular arrangement with respect to the force distributing member, and in which one of the force transmitting linkages is made yieldable while of the other force transmitting linkages is made relatively rigid so that the rigid link will rotate with respect to the force distributing member when an actuating force is applied thereto in such manner that the intersection of the line of force of the actuating force with respect to the force distributing member changes as the intensity of the actuating force increases.

Another object of the present invention is the provision of a new and improved force transmitting mechanism of the above described type in which the actuating force is applied to the mechanism by means of a pivotally supported lever from which actuating force is transmitted through a drag link pivotally connecting the actuating lever and rigid link in such manner that the intersection of the line of force of the drag link with respect to the force distributing member continually changes as the actuating lever is moved.

A still further object of the present invention is the provision of a new and improved automotive hydraulic braking system having a pair of hydraulic cylinders, one of which is connected to the front wheel brakes of the vehicle and the other of which is connected to the rear wheel brakes of the vehicle and the fluid displacing pistons of which are driven by any of the above described force transmitting mechanisms so that the ratio of the hydraulic pressures which is being supplied to the front and rear wheel brakes continually changes as the actuating force upon the system increases.

A still further object of the present invention is the provision of a new and improved automotive braking system of the above described type in which the ratio changing device is designed to continually increase the percentage of the actuating force which is supplied to the front wheel brakes of the vehicle as the total amount of actuating force applied to the system is increased.

The invention resides in certain constructions and combinations and arrangements of parts; and further objects and advantages will become apparent to those skilled in the art to which the invention relates from the following description of the preferred embodiment described with reference to the accompanying drawing forming a part of this specification, and in which:

Figure 1 is a generally schematic cross sectional view of an automotive hydraulic braking system for continually changing the ratio of the forces that are applied to its front and rear wheel brakes as the total actuating force for the system increases, and in which an alternative arrangement of its actuating lever is shown by dot-dash lines; and Figure 2 is a cross sectional view taken upon the line 2—2 shown in Figure 1.

The automotive braking system shown in Figure 1 generally comprises a pair of front wheel brakes A (only one of which is shown) and a pair of hydraulically actuated rear wheel brakes B (only one of which is shown) each of which are independently operated by means of hydraulic pressure from a pair of hydraulic cylinder chambers 10 and 12 through lines 14 and 16 respectively. The hydraulic cylinder chambers 10 and 12 are shown located in an integral master cylinder body member 18 and extend along generally parallel axes. The hydraulic cylinder chambers 10 and 12 are provided with fluid displacing pistons 20 and 22 respectively, which in turn are adapted to be simultaneously actuated by means of a pressure changing force transmitting mechanism C, about to be described, and which in turn is driven by a single foot pedal or actuating lever D.

As previously indicated, force from the foot pedal lever D is transmitted to each of the fluid displacement pistons 20 and 22 respectively through the force transmitting mechanism C which delivers to each of the pistons 20 and 22 differing fractions of the force applied to the foot pedal lever D as the intensity of the force that is applied to the foot pedal lever D increases. The force transmitting mechanism C comprises a force distributing lever 24 which extends generally transversely to the longitudinal axes of the hydraulic cylinder chambers 10 and 12, and which is adapted to move generally toward and away from the hydraulic cylinders 10 and 12, while at the same time being supported in a manner which permits a rocking action with respect thereto. In the device shown in Figure 1, the force distributing lever 24 is supported and guided for movement toward and away from the cylinders 10 and 12 by means of a sliding rod 26, one end of which is pinned to the force distributing lever 24 adjacent its mid-section, while the other end of the sliding rod 26 is received in longitudinally extending bore 28 positioned in the body member 18 between and generally parallel to the longitudinal axes of the hydraulic cylinder chambers 10 and 12. Force from the force distributing lever 24 is delivered to the pistons 20 and 22 through the driven piston rods 30 and 32 respectively, one end of which bears against the respective fluid displacement pistons while their other ends are pinned to the force distributing lever 24 on opposite sides of the sliding rod 26.

Force from the foot pedal lever D is applied to the force distributing lever 24 through a pair of links 34 and 36, one end of each of which are pinned to respective ends of the force distributing lever 24, and the other end of which are pinned together to form a triangular relationship with respect to the force distributing lever 24. The link 34 is relatively rigid, while the link 36 is made relatively yieldable; so that the link 34 can rotate relative to the force distributing lever 24 as increasing force is applied to the force transmitting mechanism C. The intersection of the line of force applied to the force transmitting mechanism C with its force distributing lever 24 will gradually change as increasing force is applied to cause the link 34 to rotate relative to the lever 24. As the intersection of this line of force with the line connecting the pivotal connections of the links 34 and 36 with the force distributing lever 24 moves closer to one of the driven piston rods 30 or 32, the moment arms with respect to the driven piston rods 30 and 32 change; so that the ratio of the force that is applied to one piston rod increases as the line of force approaches it, while the ratio of the force that is applied to the other driven piston rod gradually reduces. The link 36 will preferably be made yieldable so that it will gradually be shortened as force is applied thereto and can be constructed in numerous ways: as for example by an air cylinder; or a hydraulic cylinder, the discharge of which is communicated to a reservoir whose pressure increases as the fluid enters; and in the embodiment shown in the drawing, is made by means of a spring 38 having a predetermined spring rate which permits the link 36 to be foreshortened as force is applied thereto. This foreshortening rotates the applied force toward the rod 30 and causes the applied force to be distributed between the pistons 20 and 22 in the desired manner for actuating the front and rear wheel brakes A and B respectively.

In the arrangement shown by the solid lines in Figure 1 the foot pedal lever D is pivotally supported to the frame of the vehicle at its ends which is opposite to the link 36, and an interconnecting drag link 40 having one of its ends pivotally connected to the lever D and its other end pivotally connected to the rigid link 34 adjacent its pivotal connection with the yieldable link 34, transmits force from the foot pedal lever D to the force transmitting mechanism C. The geometry of the foot pedal lever D and the drag link 40 with respect to the force transmitting mechanism C is such that the longitudinal axis of the drag link 40 remains substantially parallel to the longitudinal axes of the cylinders 10 and 12, as the foot pedal lever D moves throughout its stroke. The intersection of the longitudinal axes of the link 40 and the force distributing lever 24 changes gradually in a generally uniform rate to give the desired distribution of force to the front and rear wheel brakes A and B respectively.

In some instances, however, it may be desired to have the rate at which this ratio changes continuously vary; and this can be accomplished either by changing the rate of foreshortening of the yieldable link 34, as can be done, for example: by suitably shaping the spring 38, or by using a plurality of springs which are brought into play consecutively as the link is foreshortened, or as can be done in manners well known in the art when fluid pressure cylinders are used, and can also be accomplished by changing the foot pedal lever D in the manner shown by the dot-dash lines in Figure 1 wherein the lever D is pivoted on the side of the link 40 in which the rigid link 34 is positioned. When the construction shown by the dot-dash lines is used, the centerline of the interconnecting drag link 40 will no longer remain substantially parallel to the longitudinal axes of the hydraulic cylinders 10 and 12; and its intersection with respect to the theoretical line through its pivotal connections with the links 34 and 36, proceeds toward the driven piston rod 30 as the foot pedal lever D is actuated. It will be seen that the combined result of this geometry, and the foreshortening of link 36 will be such that the ratio of force distribution between the driven piston rods 30 and 32 will gradually increase in favor of the piston rod 30 at an increasing rate as the foot pedal lever shown by the dot-dash lines is stroked.

The details of the construction of the above described mechansim can be considerably varied. Some of these details of the device shown in the drawing will now be described. As thus seen in Figure 2, the rigid link 34 is formed by means of a pair of bars 42 and 44 one end of which are pinned to the force distributing lever 24, and the other end of each of which are respectively pinned on a common centerline to a pair of bars 46 and 48 which form the drag link 40. The other end of the bars 46 and 48 are positioned on opposite sides of the foot pedal lever D and are pinned thereto in a manner providing the necessary arcuate movement of the drag link, both with respect to the foot pedal lever D, and the rigid link 34. The bars 42 and 44 are bent outwardly intermediate their ends so as to accommodate a rod 50 which acts as a retainer for the spring 38. One end of the rod 50 is rigidly connected to a clevis 52 that is pinned to the force distributing lever 24, and the other end of the rod projects through an opening in another clevis 54 which has legs that are positioned between the bars 42 and 44 and are pinned thereto on a common axis. The spring 38 is positioned about the rod 50 with its ends between the clevises 52 and 54, and is of such a length in its uncompressed state as to cause the mechanism to assume the general configuration shown in the drawings.

When the foot pedal lever D is depressed to exert a force upon the force transmitting mechanism C, the foot pedal lever D shown by the solid lines will pivot about its upper end to cause the interconnecting drag link 40 to move in a manner generally parallel with respect to the longitudinal axes of the cylinders 10 and 12. Some of the force that is applied to the mechanism C by the drag link 40 will be transmitted to the force distributing lever 24 by the rigid link 34, while the remainder of the force will be transmitted through the spring 38 to gradually compress this spring. At the beginning of the application of force by the foot pedal lever D to the mechanism shown in Figure 1, the centerline of the drag link 40 will pass through the hypothetical centerline of the force distributing lever 24 approximately midway between the piston rods 30 and 32 to distribute approximately equal forces to the pistons 20 and 22 respectively; and in the preferred sizing of the hydraulic circuitry shown in the drawing will deliver approximately equal hydraulic intensities to both the front and rear wheel brakes A and B respectively to produce substantially equal braking forces on all four wheels of the vehicle. As the force that is applied to the foot pedal lever D increases, the spring 38 will be compressed to permit rotation of the link 34 with respect to the force distributing lever 24 to cause the line of force for the drag link 40 to intersect the hypothetical centerline of the force distributing lever 24 at points which proceed toward the driven piston rod 30. This movement of the line of force towards the driven piston rod 30 causes a greater proportion of the force which is applied to the foot pedal lever D to be distributed to the piston 20 than is distributed to the piston 22, and therefore a greater percentage of the braking effort will be accomplished by the front wheel brakes of the vehicle than is accomplished by the rear wheel brakes of the vehicle. Inasmuch as the geometry shown by the solid lines in Figure 1 is such as to maintain the centerline of the drag link 40 substantially parallel to the longitudinal axes of the cylinders 10 and 12 throughout the application of the brakes, and inasmuch as the spring rate of the spring 38 is substantially constant, the rate of change of the vehicle's braking effort between its front and rear wheel brakes A and B as its brakes are applied with increasing intensity, will change generally uniformly. In the pedal arrangement shown by the dot-dash lines in Figure 1, the centerline of the drag link 40 is angularly displaced with respect to the hypothetical centerline of the force distributing lever 24 as the brakes are applied to in itself produce a change in the ratio of the force which is applied to the rods 30 and 32. The combined effect of this change with the arcuate movement of the rigid link 34 will cause this intersection to move towards the driven piston rod 30 at a progressively increasing rate so that the ratio of braking effort developed by the front wheel brakes A with respect to that of the rear wheel brakes B increases at a generally increasing rate.

While the invention has been described in considerable detail, I do not wish to be limited to the particular constructions shown and described; and it is my intention to cover hereby all novel adaptations, modifications, and arrangements thereof which come within the practice of those skilled in the art to which the invention relates.

I claim:

1. A force transmitting mechanism for distributing forces between two driven devices comprising: a pair of driven force transmitting members, a force distribution member pivotally connected to said driven members at spaced points to transmit forces thereto, a rigid link, a pivotal connection between said rigid link and said force distribution member, a yieldable link pivotally interconnecting points on said force distribution member and said rigid link which are spaced apart from said first mentioned pivotal connection to form a triangular arrangement between said links and said force distribution member, said yieldable link being constructed and arranged so that its length progressively changes as increasing force is applied thereto, and means for applying a force in a generally given direction to said mechanism adjacent the pivotal connection between said links, whereby said first link rotates relative to said force distribution member as the force applied by said means increases to change the point at which the line of force of said means intersects said force distribution member.

2. A force transmitting mechanism for distributing forces between two driven devices comprising: a pair of driven force transmitting members, a force distribution member pivotally connected to said driven members at spaced points to transmit forces thereto, a rigid link, a pivotal connection between said rigid link and said force distribution member, a yieldable spring pivotally interconnecting points on said force distribution member and said rigid link which are spaced apart from said first mentioned pivotal connection to form a triangular arrangement between said link, spring and said force distribution member, said spring having an appreciable spring rate, and means for applying a force in a generally given direction to said mechanism adjacent the pivotal connection between said spring and link, whereby said first link rotates relative to said force distribution member as the force applied by said means increases to change the point at which the line of force of said means intersects said force distribution member.

3. A force transmitting mechanism for distributing forces between two driven devices comprising: a pair of driven force transmitting members, a force distribution member pivotally connected to said driven members at spaced points to transmit forces thereto, a rigid link, a pivotal connection between said rigid link and said force distribution member, a yieldable link pivotally interconnecting points on said force distribution member and said rigid link which are spaced apart from said first mentioned pivotal connection to form a triangular arrangement between said links and said force distribution member, said yieldable link being constructed and arranged so that its length progressively changes as increasing force is applied thereto, an actuating lever extending generally parallel to said force distribution member, and a third link having one end pivotally connected to said actuating lever and its other end pivotally connected to said rigid link, whereby said first link rotates relative to said force distribution member as the force applied by said means increases to change the point at which the line of force of said means intersects said force distribution member.

4. A force transmitting mechanism for distributing forces between two driven devices comprising: a pair of driven force transmitting members, a force distribution member pivotally connected to said driven members at spaced points to transmit forces thereto, a rigid link, a pivotal connection between said rigid link and said force distribution member, a yieldable link pivotally interconnecting points on said force distribution member and said rigid link which are spaced apart from said first mentioned pivotal connection to form a triangular arrangement between said links and said force distribution member, said yieldable link being constructed and arranged so that its length progressively changes as increasing force is applied thereto, an actuating lever extending generally parallel to said force distribution member, and a third link having one end pivotally connected to said actuating lever and its other end pivotally connected to said rigid link, said actuating lever being pivotally supported on the same side of said third link in which said rigid link is located, whereby said first link rotates relative to said force distribution member as the force applied by said means increases to change the point at which the line of force of said means intersects said force distribution member.

References Cited in the file of this patent
UNITED STATES PATENTS

| | | |
|---|---|---|
| 1,678,949 | Moser | July 31, 1928 |
| 1,888,092 | Peterson | Nov. 15, 1932 |
| 2,062,167 | Dieter | Nov. 24, 1936 |
| 2,247,827 | Wegmann | July 1, 1941 |
| 2,559,850 | Davis | July 10, 1951 |